G. W. PARKER.
Vegetable-Cutters.

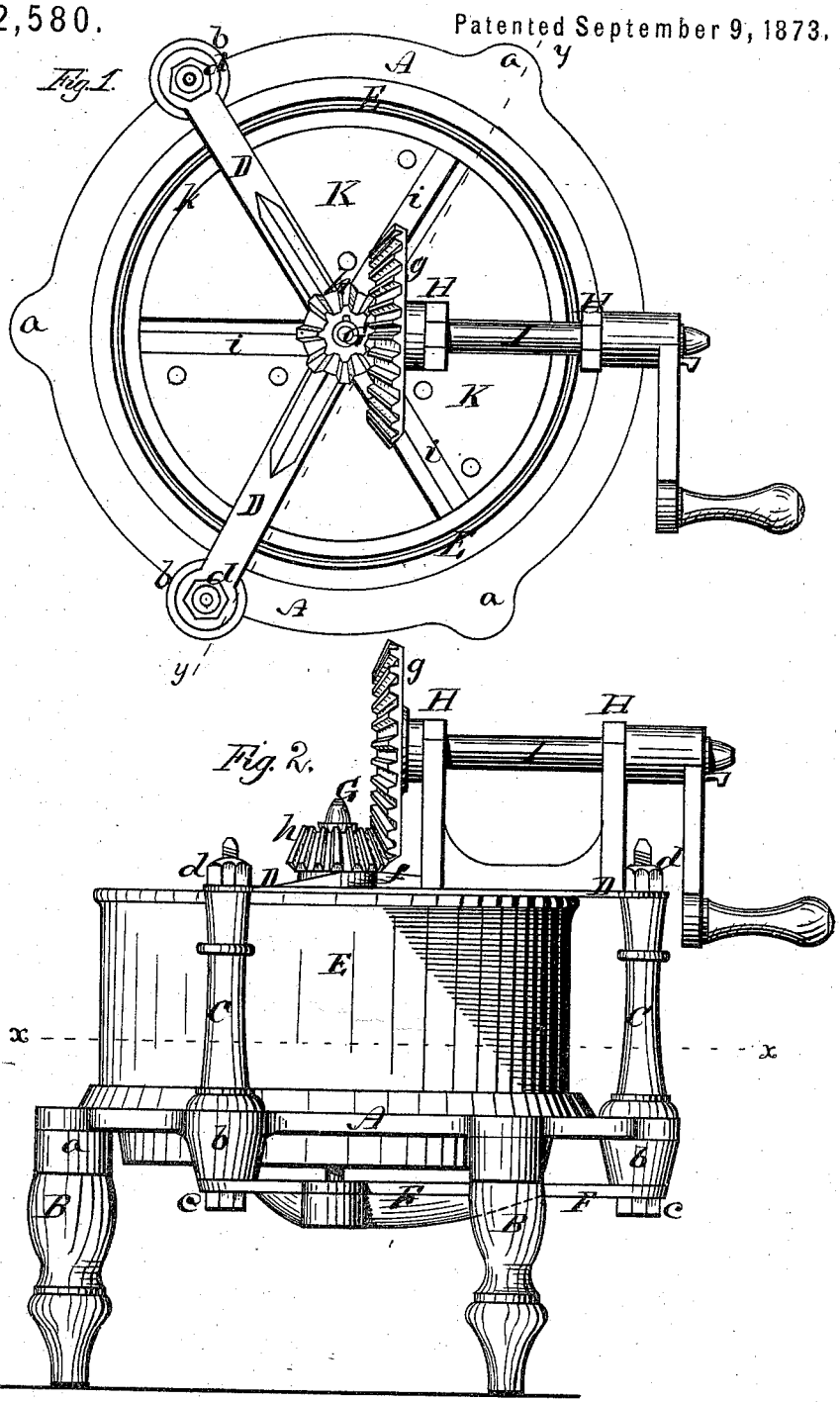

No. 142,580. Patented September 9, 1873.

2 Sheets--Sheet 2.

Witnesses:
E. M. Gallaher.
Geo. P. Bartle.

Inventor:
Geo. W. Parker
By his Atty.
J. A. Brown.

UNITED STATES PATENT OFFICE.

GEORGE W. PARKER, OF BELLAIRE, OHIO, ASSIGNOR OF ONE-HALF HIS RIGHT TO C. L. POORMAN, OF SAME PLACE.

IMPROVEMENT IN VEGETABLE-CUTTERS.

Specification forming part of Letters Patent No. 142,580, dated September 9, 1873; application filed May 1, 1873.

*To all whom it may concern:*

Be it known that I, GEORGE W. PARKER, of Bellaire, in the county of Belmont and State of Ohio, have invented an Improved Vegetable-Cutter; and I do hereby declare that the following is a full and exact description thereof, reference being had to the accompanying drawings making part of this specification—

Figure 3:
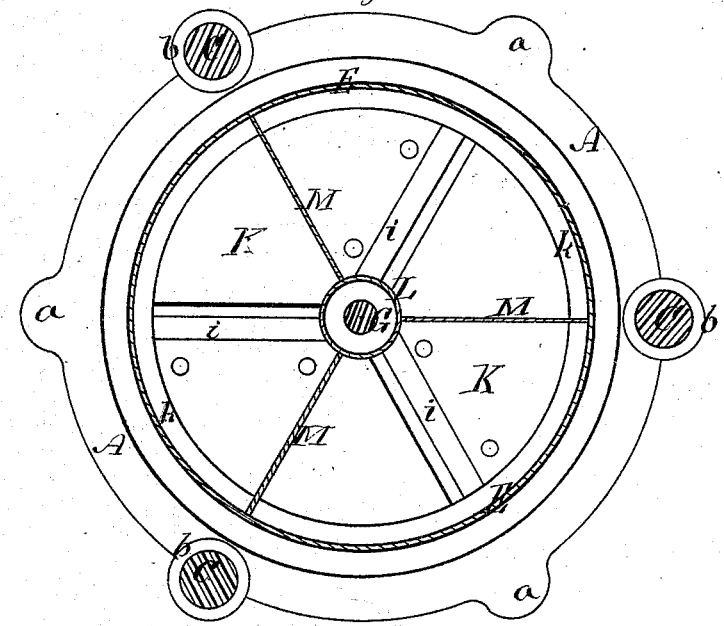
Figure 4:
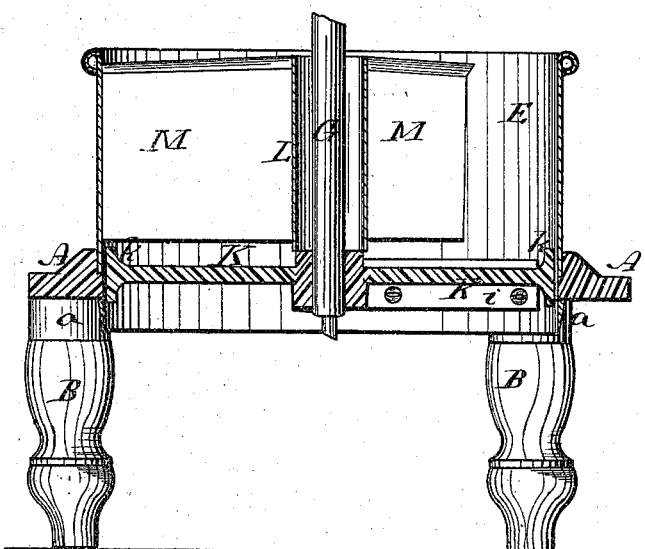

Figure 1 being a top view of the improved vegetable-cutter; Fig. 2, a side view of the same; Fig. 3, a horizontal section in a plane indicated by the line $x\ x$, Fig. 2; Fig. 4, a vertical section in a plane indicated by the line $y\ y$, Fig. 1.

Like letters designate corresponding parts in all of the figures.

First. In the construction of the parts which compose the body of the machine, a bottom plate or ring, A, is provided with sockets $a\ a\ a$ to receive legs B B B, and with other sockets, $b\ b\ b$, to receive standards C C C, secured thereto by screws and nuts $c\ c\ c$. Upon the upper ends of these standards a top plate or cap, D, of open form, is secured by screws and nuts $d\ d\ d$. All these parts may be made of cast-iron, except the legs, which may more cheaply be made of wood. A cylindrical sheet-metal hopper or holder, E, to contain the vegetables to be sliced or cut, is clamped between the bed A and cap D. Thus all the parts composing the body of the machine are cheaply made and readily put together and taken apart. A bearing, F, for the central vertical cutter-shaft G, is sustained beneath the bed-plate A by the screws and nuts $c\ c\ c$, which fasten the standards C C C to the bed-plate. The upper end of the driving-shaft has its bearing $f$ in the upper plate or cap D. The standards H H, which furnish bearings for the driving crank-shaft I, extend upward from the cap D. The driving-shaft I is geared to the cutter-shaft G by a bevel-wheel, $g$, and pinion, $h$, respectively, on the two shafts.

Second. In the construction and arrangement of the cutter-wheel K and hopper or cutting-box E, the cutter-wheel, bearing the knives $i\ i\ i$, revolves in the bottom part of the hopper, and forms the bottom thereof, on which the vegetables rest to be cut or sliced. A raised rim, $k$, on the outer upper edge of the cutter-wheel, prevents pieces and juices of the vegetables from escaping at or clogging the opening between the periphery of the cutter-wheel and the hopper or cutting-box.

Third. Around the cutter-wheel shaft G is a cylindrical or tubular case, L, fitting at the lower end close to the hub $l$ of the cutter-wheel, so that the vegetables cannot interfere with the shaft; and from this central case or tube partitions M M M extend radially outward to the hopper E, to prevent the vegetables from being carried round by the cutter-wheel, on which they rest. The slices of the vegetables fall through the throats or apertures in the wheel in front of the several knives $i\ i\ i$.

What I claim as my invention, and desire to secure by Letters Patent, is—

1. The combination of the bottom or ring A, standards C C C, radially-armed top frame D, sectional hopper E, and radially-armed bearing F, constructed and arranged substantially as and for the purpose herein specified.

2. The shaft-shielding tube I and radial partitions M M M, in combination with the hopper or cutting-box E and cutter-wheel K, substantially as and for the purpose herein specified.

Specification signed by me this 24th day of December, 1872.

GEORGE W. PARKER.

Witnesses:
F. BEBOUT,
W. H. RIKER.